United States Patent [19]
Starkey

[11] Patent Number: 6,116,891
[45] Date of Patent: Sep. 12, 2000

[54] MOLD HAVING A SIDE-ACTION CAM MECHANISM AND MOLDING METHOD

[75] Inventor: Glenn Starkey, North Barrington, Ill.

[73] Assignee: Progressive Components International Corporation, Wauconda, Ill.

[21] Appl. No.: 09/264,539

[22] Filed: Mar. 8, 1999

Related U.S. Application Data

[63] Continuation of application No. 08/813,281, Mar. 10, 1997, abandoned.

[51] Int. Cl.[7] .................................................. B29C 45/44
[52] U.S. Cl. .................. 425/556; 425/577; 425/DIG. 58
[58] Field of Search ........................... 425/577, DIG. 58, 425/556

[56] References Cited

U.S. PATENT DOCUMENTS 4,889,480  12/1989  Nakamura et al. ...................... 425/577

OTHER PUBLICATIONS

Undated Hasco product catalog pages relating to "Mechanical Sliding Device" (4 pages).
Undated IEM catalog pages relating to "Assembly and Technical Information For The Mini–Cam ™and Retainers" 5 pages).

*Primary Examiner*—Tim Heitbrink
*Attorney, Agent, or Firm*—Barnes & Thornburg

[57] ABSTRACT

A side-action mechanism is provided for forming recesses or apertures in injection molded plastic parts and which includes a slide carrier and a driver actuator therefor which are part of a modular side-action cam unit that can be attached entirely into one mold half, e.g., the core half, so as to avoid having to machine and customize the other mold half or cavity half as with prior side-action devices. In addition, the modular side-action cam unit provides a driving surface that is preferably flat which engages the bottom flat of the cavity half to obviate the alignment problems which can occur in the prior angled cam pin side-action mechanisms. The present modular cam unit is a small unit and does not take as long to install into the mold as the prior side-action cam mechanisms which required installing parts in both the cavity and core halves of the mold. The cam unit herein in its preferred form, utilizes a total of five (5) parts which are all self-contained in a housing to provide a design which can be fit in the mold in a very straightforward and quick manner by the mold builder. The actuator is spring biased so that the opening force of the mold is not used to withdraw the core pin from the mold cavity. Preferably, two-stage spring loading is utilized with a high initial spring load applied to free the coring pin from the plastic in the cavity and a lower secondary load applied for the remainder of the withdrawal travel.

28 Claims, 10 Drawing Sheets

MOLD HAVING A SIDE-ACTION CAM MECHANISM AND MOLDING METHOD

This is a continuation of prior application Ser. No. 08/813,281, filed Mar. 10, 1997, now abandoned which is hereby incorporated herein by reference in its entirety.

FIELD OF THE INVENTION

The invention relates to a molding side-action mechanism and method, and more particularly, to a modular cam side-action mechanism for forming undercuts or recesses in a molded plastic part.

BACKGROUND OF THE INVENTION

In injection molding, upper and lower mold halves are brought together to define a mold cavity into which heated molten plastic is injected under pressure. The mold halves are typically vertically aligned with an upper mold portion termed the cavity half and a lower mold portion termed the core mold half. For forming holes or apertures or undercuts through sides or on other locations of molded pieces, side action coring elements are provided which are projected into the molding cavity as the mold halves are closed and which must be retracted from the cavity as the mold is opened and before ejection of the part can take place. In conventional molds, this is accomplished by using guide pins and/or offset cams fixed in the cavity half of the mold which cooperate with a slide carrier which carries the coring element and includes a bore machined at an angle therein. As the mold halves close and open, the angled pin is received for sliding in the angled bore of the carrier for causing the side action to slide laterally on wear plates attached in the core half.

One problem with current side-action devices is that the alignment of the angled pin with the carrier bore must be fairly exact to prevent damage or breakage of the relatively small angled pin. In addition, the closing and opening forces during cycling of the mold by the press are relatively large and create high forces between the engaging surfaces of the pin and bore which can produce scoring and galling of these surfaces. Such surface wear is also exacerbated by any misalignment problems. The sliding action between the coring element carrier and the wear plate/gib assembly can also produce galling of these surfaces generating high frictional resistance which the angled cam pin may not be able to overcome before it fails. Accordingly, there is a need for a side-action mechanism which does not utilize the angled cam pins and bores of the prior art and is more forgiving in terms of the tolerances required for trouble-free operation of the side-action unit.

With prior side-action cam mechanisms, both the cavity and core half of the mold need to be modified to accommodate the parts thereof. The cavity half requires a mounting bore for the previously described angled cam pin. In addition, there typically will be a pocket formed in the cavity half for a cam lock which provides the final lock for fitting when the mold halves are closed and prevents any blowback of the side action mechanism due to molding pressure. The core half has a recess therein to accommodate the slide carrier and attaching the wear plates therein. Thus, the mold halves require substantial modifications and customizing to accept the numerous parts for the current side-action mechanisms. Accordingly, there is a need for a side-action mechanism which does not require as much customizing of the mold halves, and preferably which reduces or eliminates the present machining currently required of the cavity half for side-action mechanisms.

As the side-action mechanisms currently used in molds rely on parts that are fixed to the respective mold halves, there is no additional force besides that of the opening of the mold halves which pulls the side coring element from the mold cavity. In order to properly release the coring element from the surrounding plastic thereon, it is known to draft the coring pins so as to provide for better release characteristics from the cavity and the plastic that has shrunk around the pin in the cavity. The drafting facilitates removal by reducing the friction between the coring element and the plastic as it is being pulled from the mold cavity. Proper release of the coring element from the cavity is important so as to avoid damage to the molded part. Thus, a side-action mechanism which enhances the release of the coring element from the mold cavity when the mold is being opened would be desirable.

In prior side-action cam mechanisms, it is common for the angled pin to be withdrawn entirely from its corresponding carrier bore in the core half of the mold when the mold halves are opened. When this occurs, there is no positive hold on the slide carrier in the retracted position so as to keep the carrier bore properly aligned for subsequent insertion of the angled pin therein when the mold halves are closed. If the slide carrier is to move from this position and the mold halves are closed, it is likely that the angled pin and the mold itself can become damaged from such movement. Accordingly, it is known to provide detent retainers for side-action slide carriers attached in the core retaining plate of the mold—see U.S. Pat. Nos. 4,515,342; 4,768,747; and 5,397,226. However, these detent mechanisms do not provide a strong positive lock for the slide carrier so that the detents will release the slide carrier if a sufficient releasing force is present. The use of a detent mechanism also is an additional component of the side-action mechanism that must be manufactured and assembled into the mold, thus raising the expense and increasing the complexity associated therewith. Thus, a side-action mechanism which does not require a separate component for detenting and retaining the coring element withdrawn from the mold cavity would be desirable.

SUMMARY OF THE INVENTION

The present invention is directed to a side-action mechanism for forming recesses or apertures in injection molded plastic parts and which includes a slide carrier and a driver actuator therefor which are part of a modular side-action cam unit that can be attached entirely into one mold half, e.g., the core half, so as to avoid having to machine and customize the other mold half or cavity half as with prior side-action devices. In addition, the modular side-action cam unit provides a driving surface that is preferably flat which engages the bottom flat of the cavity half to obviate the alignment problems which can occur in the prior angled cam pin side-action mechanisms. The present modular cam unit is a small unit and does not take as long to install into the mold as the prior side-action cam mechanisms which required installing parts in both the cavity and core halves of the mold. The cam unit herein in its preferred form, utilizes a total of five (5) parts which are all self-contained in a housing to provide a design which can be fit in the mold in a very straightforward and quick manner by the mold builder.

The driver actuator of the cam unit is biased towards the cavity mold half as by compression springs which can be tailored to vary the withdrawal force exerted on the coring element when the mold halves are opened so that during the initial withdrawal from the mold cavity, there is a substantially higher withdrawal force exerted on the coring element so as to more readily overcome the frictional resistance between the coring element and the plastic formed therearound in the mold cavity. Once the coring element has been pulled a short distance and/or withdrawn from the molding cavity, the spring force can be reduced for the remaining travel of the coring element to a retracted position in the core mold half. Typically, the core pin is drafted to assist in withdrawal from the mold cavities; however, there is still a grip from the shrinkage of the plastic around the coring element. Therefore, to assist in breaking this seal, the high initial spring force is desirable. By use of the high initial spring force, the present side-action cam mechanism is a substantial improvement over prior rigidly mounted side-action mechanisms which do not vary the withdrawal force applied to the coring element.

In a preferred form, a side-action mechanism is secured to one of the mold portions for forming undercuts or recesses in the plastic part with the side-action cam mechanism including a driver actuator having a substantially flat driving or engagement surface extending in a plane substantially perpendicular to the mold movement direction and biased to extend towards the other mold portion for being engaged by a flat surface of the other mold portion as the mold portions are closed and opened. Cam surfaces are provide on the slide carrier and the driver actuator which cooperate for driving of the slide carrier by the driver actuator. The cam surfaces cooperate to move the slide carrier to slide transversely of the mold movement direction (1) towards the mold cavity to project the side coring element therein when the driver actuator is engaged by the flat surface of the other mold portion as the mold portions are moved together and closed, and (2) away from the mold cavity to withdraw the side coring element therefrom as the mold portions are moved away from each other and opened. As previously mentioned, engagement between flat surfaces of the driver actuator and the mold portion reduces the extreme alignment conditions associated with angled pins and angled bores provided in prior side actions.

The one mold portion to which the side-action mechanism is mounted can include a pocket or recess formed therein. A housing which mounts the slide carrier and driver actuator for sliding movement therein can be secured in the one mold portion pocket. In this manner, the entire side-action cam unit can be secured to the one mold portion with the other mold portion being substantially free of the side action mechanism components. It is also possible to mount the present side-action mechanism in the core mold half so as to accommodate different locations for sliding of the coring element into the mold cavity depending on the location of the mold cavity and where the coring element needs to project therein. Where the coring element needs to be projected into the cavity down lower in the core half, the present cam unit can be mounted in a deeper pocket in the core half and the cavity half can be provided with a driver engaging extension aligned with the driver actuator so as to engage the extended driver actuator and depress it against its bias for projecting the side coring element into the mold cavity at the lower location. Where the side coring element is to be projected into the cavity at a higher location, such as in the cavity half of the mold, the cam unit can be secured in a riser which is attached in a pocket in the core half. The cavity has a pocket machined therein so as to accommodate the riser and cam unit when the mold portions are closed. The recess of the cavity half has a flat recessed surface which will engage the extended driver actuator and depress it when the mold is closed for projecting the side coring element into the mold cavity.

The cam surfaces of the slide carrier and the driver actuator engage each other and have a slide carrier retaining position wherein the cam surfaces cooperate to lock the slide carrier against transverse movement so that the slide carrier stays retracted from the mold cavity with the slide coring element withdrawn therefrom when the mold portions are opened and the flat surface of the driver actuator is not engaged by the flat surface of the other mold portion. Thus, the modular cam unit herein obviates the need to provide a separate detenting mechanism for locking the slide carrier retracted from the mold cavity as in prior side-action mechanisms.

In a preferred form of the invention, the driver actuator includes a mold engaging actuator portion which includes the mold engaging flat surface and inclined cam members thereon. The driver actuator has a spring for biasing the driver flat surface to extend towards the other mold portion and a guide portion fixed to the one mold portion for guiding movement of the mold engaging actuator portion as it moves with the bias of the spring when the mold portions are being opened and move away from each other, and against the bias of the spring when the mold portions are being closed and move towards each other. The slide carrier includes inclined guide slots for receiving the driver cam members therein for driving of the slide carrier transversing towards and away from the mold cavity as the mold portions close and open, respectively.

The guide portion can include a stop so as to limit the travel of the actuator portion with the spring bias towards the other mold portion when the mold portions are opened and the driver actuator flat surface is not engaged by the flat surface of the other mold portion to keep the cam members engaged with portions of the guide slot to lock the slide carrier against transverse movement and retracted away from the mold cavity with the side coring element withdrawn therefrom. The provision of the stop ensures that the cam members remain engaged in the guide slots so as to prevent movement of the slide carrier towards the mold cavity absent closing of the mold portions.

The present modular cam mechanism does not rely on parts secured to the cavity half of the mold for driving the slide carrier as with the prior angled cam pins and instead utilizes a spring bias. In the event that the spring bias fails to extend the driver actuator so as to retract the slide carrier for withdrawing the side coring element from the mold cavity, there should be no part ejection from the mold cavity. Should the ejector assembly attempt to eject the part from the cavity with the side coring element therein, ejector pin failure can result. Accordingly, the mold can also include a sensor for detecting movement of the slide carrier to the retracted position and for enabling a conventional ejector mechanism of the mold when the sensor detects the slide carrier in the retracted position with the cam surfaces in their slide carrier retaining position. The sensor only enables the ejector mechanism when the slide carrier is detected in its proper retracted position with the driver actuator extended towards the other mold portion and the cam surfaces in their slide carrier retaining position. At this time, the ejector mechanism can eject the part from the mold cavity.

In another form of the invention, the present side action cam mechanism herein includes a two-stage biasing member for the driver actuator to urge the driver actuator towards the cavity mold half with a high initial bias force so as to move the side coring element in the withdrawal direction from the mold cavity with the plastic part formed therein as the mold portions open with a high withdrawal force for a short distance. After the side coring element has been withdrawn and/or traveled the short distance, the biasing member urges the driver actuator towards the one mold portion with a secondary bias force which is lower than the higher initial bias force for the remaining travel of the side coring element away from the mold cavity. While it is known to provide draft or taper on core pins so as to facilitate easy removal of the pin from the mold cavity after the part has been formed, it is desirable to further enhance the ability of the core pin to smoothly and cleanly separate from the parts in the mold cavity when it is withdrawn therefrom. After the plastic has been injected into the mold and the part is being formed, shrinkage or contraction of the plastic in the mold cavity occurs. Such shrinkage of the plastic increases the grip and frictional forces of the plastic on the core pin. Accordingly, the use of the two-stage biasing member herein provides advantages in terms of overcoming the frictional forces due to shrinkage in addition to that provided by drafting of the pin.

Preferably, the high initial bias force is approximately 200 pounds and can act over a distance of approximately 0.010 inches and the secondary bias force is approximately 30 pounds and can act over a distance of approximately 0.150 inches. The two-stage biasing member can include at least one high spring force disk spring member and a lower spring force coil spring member. The disk spring member can include a pair of Belleville springs which are attached together as by an adhesive which, in turn, can be adhered to the coil spring to form the two-stage biasing member.

Another aspect of the present invention is a molding method for forming a plastic part with the mold including first and second mold portions movable towards and away from each other in a mold movement direction and a modular side-action cam mechanism therefor. The molding method can include attaching the modular cam mechanism to one of the first and second mold portions, providing a driver actuator of the modular cam mechanism having an engaging surface, extending the driver actuator engagement surface in the mold movement direction towards the other mold portion, moving the mold portions together to engage the driver actuator engagement surface and depress the driver actuator with the other of the first and second mold portions, and driving a slide device carrying a side coring element as an incident of the engagement of the actuator and mold surfaces in depressing of the driver actuator to project the coring element into a mold cavity of the closed mold portions.

The driver engagement surface can be extended by biasing the driver actuator towards the other mold portion and the slide device can be driven by providing cooperating cam surfaces on the driver actuator and the slide device so that upon movement of the mold portions together, the driver engagement surface is depressed against the bias and the cam surfaces cooperate to cause the slide device to move transversely of the direction of mold movement toward the mold cavity.

DETAILED DESCRIPTION OF THE PREFERRED EMBODIMENT

Figure 1:
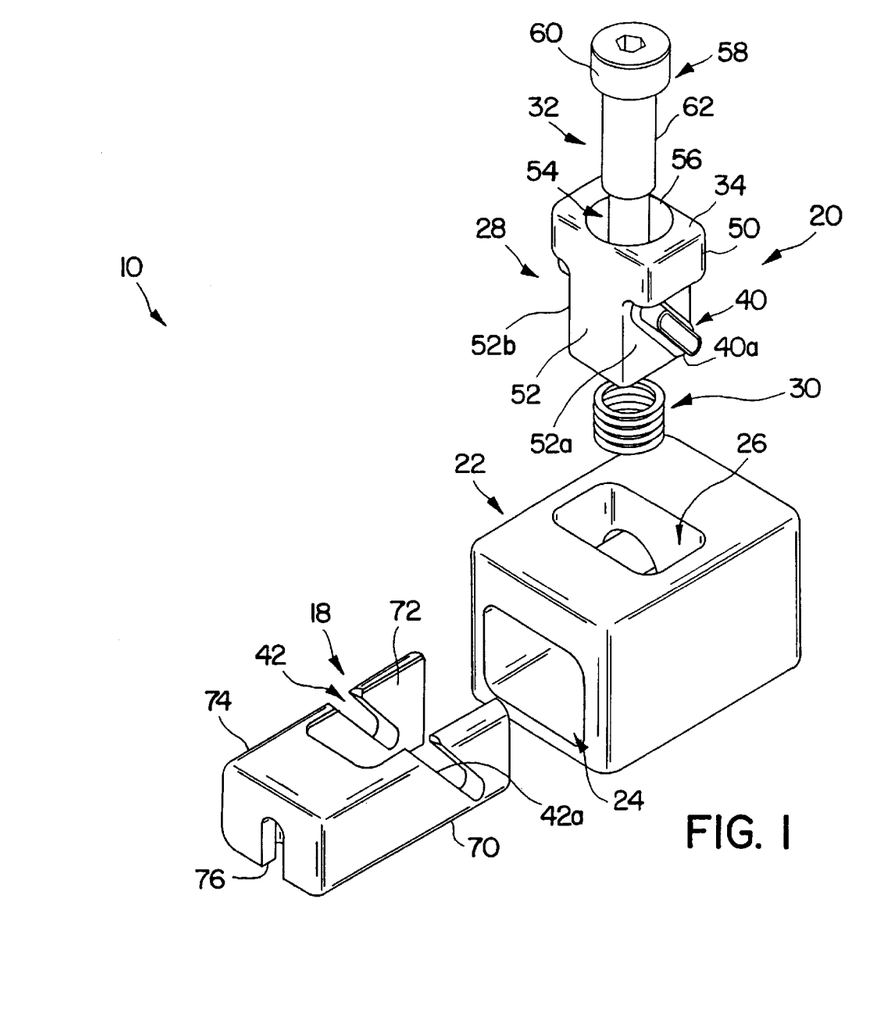
FIG. 1 is an exploded perspective view of a modular side-action cam mechanism in accordance with the present invention showing a slide carrier, a driver actuator and a housing for the slide carrier and driver actuator.
Figure 2:
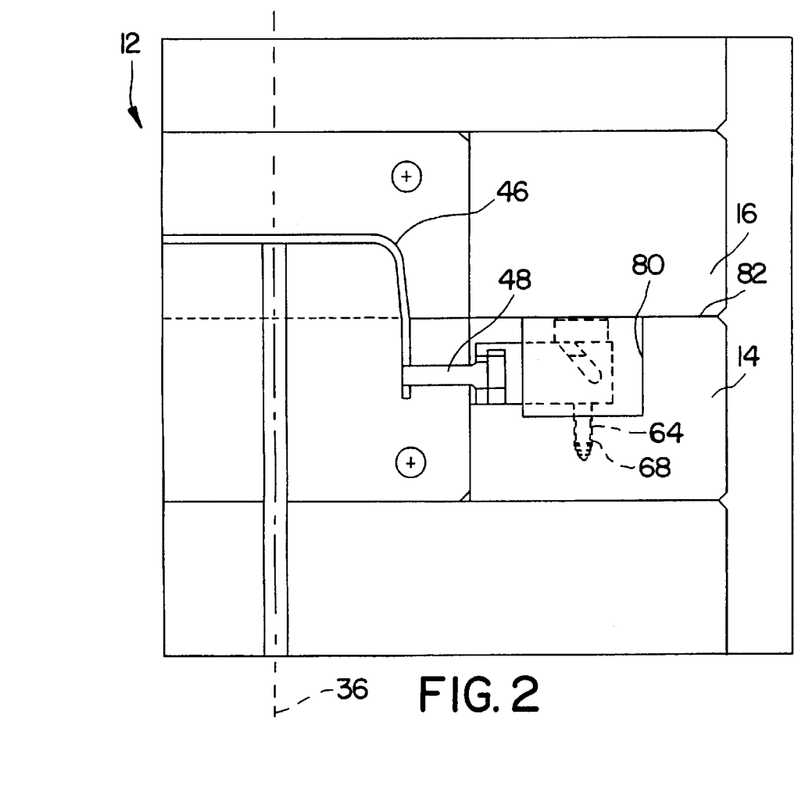
FIG. 2 is an elevational view of the side-action cam mechanism of FIG. 1 secured in a core half of a mold and carrying a coring element which is being projected into a mold cavity with the mold halves closed.
Figure 3:
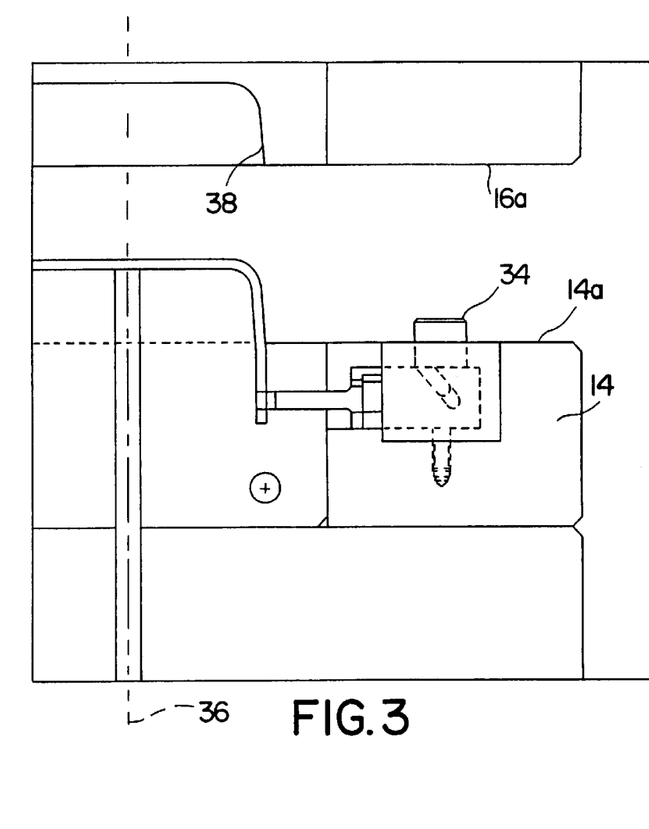
FIG. 3 is a side elevational view, similar to FIG. 2, showing the mold halves open and the driver actuator of the cam mechanism extended towards the other mold half with the coring element withdrawn from the mold cavity.

In FIG. 1, a self-contained modular side-action cam mechanism 10 in accordance with the present invention is illustrated. The present modular cam mechanism 10 is a very compact unit utilizing a very few number of parts, e.g., five parts in the embodiment of FIG. 1, which are all attached in the mold 12, preferably in the core mold half 14, as shown in FIGS. 2 and 3. Thus, the cam mechanism 10 does not require that there be substantial modifications to the cavity half 16 for the components of the cam mechanism 10 as with prior side-action cam mechanisms that require machining bores and pockets and attaching angle pins and cam locks to the cavity half, thus increasing the expense associated with such a customized mold. By contrast, because the modular cam mechanism 10 is entirely self contained in a single unit that can be attached to the core mold half 14, the self-contained, modular side-action cam mechanism 10 herein lends itself towards standardization as only one mold half need be modified to accommodate the cam mechanism 10.

The modular side-action cam mechanism includes a slide carrier 18 and a driver actuator 20 which are mounted for sliding movement in a housing 22 through respective transverse openings 24 and 26 formed therein. The driver actuator 20 includes a mold engaging actuator or plunger portion 28 which is biased towards the cavity mold half 16 by spring member 30 and guided for movement between an extended position (FIG. 3) and a depressed position (FIG. 2) by a guide portion 32 which is fixed in the core half 14 to mount the cam mechanism 10 thereto. The mold engaging actuator portion 28 includes a top driving or engagement surface 34 which can substantially lie in a plane transverse to the direction of movement of the cavity mold half 16 towards and away from the core mold half 14 along their longitudinal axis 36. The driving surface 34 is preferably flat to minimize alignment problems as discussed with respect to prior side-action devices. With the cam mechanism 10 mounted to the core mold half 14, the top surface 34 of the mold engaging actuator portion 28 can be engaged by the lower surface 16*a* of cavity mold half 16 which will normally be a flat surface similar to the surface 34 and lie in a plane normal or perpendicular to the mold longitudinal axis 36. In this manner, the mold closing forces are transmitted to the cam mechanism 10 by engagement between the flat surfaces 16*a* and 34 of the cavity mold half 16 and the driver actuator 20, respectively. Accordingly, the present cam mechanism 10 does not require the extremely tight tolerances as in prior cam mechanisms utilizing angled cam pins and inclined bores for transmiting the mold closing forces for sliding movement of the slide carrier thereof. Other mounting shapes for the engaging surfaces 34 and 16*a* may be employed with the cam mechanism 10 herein while still avoiding the tight tolerances of the prior angled pin cam devices.

For transmitting the closing longitudinal movement of the mold halves 14 and 16 into sliding movement for the slide carrier 18 towards and away from a mold cavity 38 of the mold 12 in a direction transverse to the longitudinal axis 36, inclined cam members or ears 40 are provided on the driver actuator portion 28 and cooperating inclined guide slots 42 are formed in the slide carrier 18. Accordingly, when the mold portions 14 and 16 are closed for forming a plastic part 46 in the mold cavity 38 thereof, the cavity mold surface 16*a* will engage the top surface 34 and push the cam members 40 downward so that engaging cam surfaces 40*a* and 42*a* of the respective cam members 40 and guide slots 42 cooperate to cause the slide carrier 18 to be driven towards the mold cavity 38 sliding through the opening 24 of the housing 22 so as to project a coring element 48, such as a core pin, into the mold cavity 38 for forming an undercut or recess in the plastic part 46, as shown in FIG. 2. When the closing force is removed on the actuator portion 28 as by opening of the mold halves 14 and 16, the bias force of spring member 30 pushes the actuator portion 20 upwardly with the cam surfaces 40*a* and 42*a* cooperating to drive the slide carrier 18 back in towards the cam mechanism housing 22, as shown in FIG. 3.

As is apparent, the cam action provided by the modular cam mechanism 10 herein is all self-contained within the unit so that no alignment problems will arise with respect to the cam surfaces 40*a* and 42*a* thereof. Moreover, the cam members 40 and guide slots 42 are always engaged with each other with the cam members 40 being driven down to the bottom of the slots 42 when the mold 12 is closed (FIG. 2) and then moving towards the upper portion of the guide slots 42 when the mold 12 is opened (FIG. 3). With the cam members 40 in the upper portions of the guide slots 42, the cam surfaces 40*a* and 42*a* are still engaged and will prevent any sliding movement of the slide carrier 18 back towards the mold cavity 38 absent closing of the mold 12. Thus, the cam surfaces 40*a* and 42*a* are provided with a slide carrier retaining position in which they cooperate to lock the slide carrier 18 away from the mold cavity 38 with the side coring element 48 withdrawn therefrom. In this manner, the modular cam mechanism 10 herein does not require any additional detenting mechanism as with prior side-action cam devices where once the angled pin is disengaged from the cooperating inclined bore in the carrier, the slide carrier has to be detented to prevent subsequent movement back towards the mold cavity. By keeping the cam surfaces 40*a* and 42*a* engaged even when the mold 12 is opened, there is no need for additional mechanisms to prevent the slide carrier 18 from sliding back towards the mold cavity 38.

The details of the modular side-action cam mechanism 10 and its mounting to the mold 12 will next be described. As best seen in FIG. 1, the driver actuator portion 28 has a T-shaped cross-sectional configuration with a larger upper mold engaging portion 50 including the flat top surface 34 and a lower cam member portion 52 having vertical side surfaces 52*a* and 52*b*. The upper portion 50 overhangs the side surfaces 52*a* and 52*b* and the cam members 40 are mounted to the side surfaces 52*a* and 52*b* spaced below the upper overhanging portion 50. The driver actuator upper and lower portions 50 and 52 include a vertical throughbore 54 extending therethrough which is countersunk to provide an enlarged countersunk top portion 56 and a counterbore portion 57 (FIG. 11) in which the spring 30 can be disposed for biasing of the actuator portion 28 upwardly out from the housing 22. The guide portion 32 for the driver actuator 20 preferably is in the form of a shoulder bolt 58 having an enlarged head 60 for seating in the enlarged bore portion 56 and a shank 62 depending from the head 60 and including a lower threaded end 64. The shank 62 is fit through the bore 54 with the spring 30 encircling it in the spring counterbore 57 and the threaded end 64 extending through a lower opening 66 in the housing 22 for being attached into a threaded bore 68 in the core mold half 14, as will be more particularly described herein.

When the surface 34 of the actuator 20 is engaged by the mold surface 16*a*, the cavity mold portion 16 will push the upper enlarged portion 50 down until it engages the top of the housing 22, which can be flush with the top part line forming surface 14*a* of the core half 14, as in FIGS. 2 and 3. In this depressed position, the bolt head 60 is spaced from the bottom of the bore portion 56. When the mold 12 opens, the spring 30 will act to push the actuator 20 up until the bottom of the bore portion 56 engages the fixed bolt head 60 so that the actuator upper portion 50 is in its extended position a predetermined distance beyond the top of the housing 22 through opening 26 thereof. In this manner, the bolt head 60 acts as a stop so that when the actuator 20 is in its extended position, the cam members 40 have slid up in their corresponding slots 42 to their slide retaining position therein.

Figure 8:
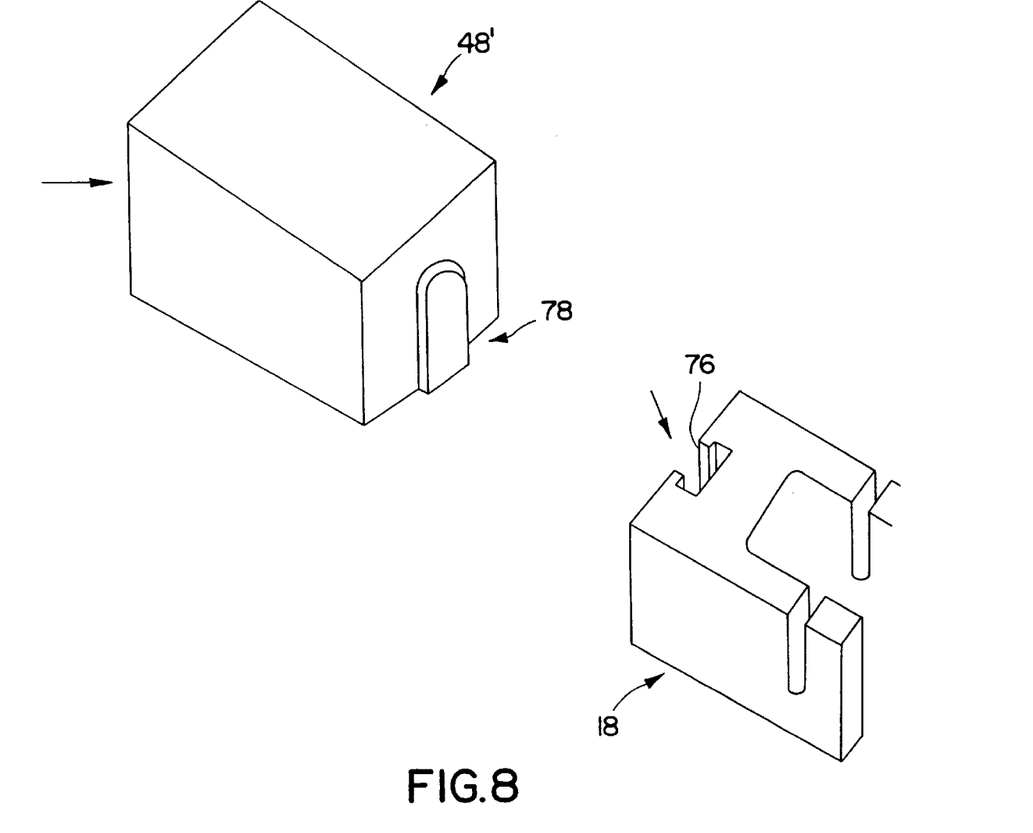
FIG. 8 is a perspective view of a key and keyway arrangement for connecting a side coring element to the slide carrier.

The slide carrier 18 has a pair of parallel rearwardly extending arms 70 and 72 in which the inclined guide slots 42 are formed with the slots 42 opening at the top of their respective arms. A coring element mounting portion 74 is provided at the front of the slide carrier 18 and includes a key slot 76 therein to form a keyway for a correspondingly shaped mounting portion 78 or key on the coring element 48, as best seen with the modified coring element 48' of FIG. 8.

As previously mentioned, the housing 22 has a pair of transverse openings 24 and 26 formed therein for receiving the slide carrier 18 and the driver actuator 20. The housing 22 can have a box rectangular orientation and be relatively small to provide a cam mechanism 10 having a very compact design in relation to prior side action devices. More specifically, in a preferred form, the housing can have dimensions of approximately 1 inch in height and width and approximately 1.25 inches for its length. The front opening 24 of the housing 22 is sized to tightly receive the slide carrier 18 slidingly therethrough. Similarly, the top opening 26 is sized so as to receive the larger upper portion 50 of the driver actuator 20 slidingly therethrough. The slide carrier 18, driver actuator 20 and housing 22 can be of hardened steel treated for wear and corrosion resistance so as to provide smooth sliding action with low friction to minimize potential galling and scoring of their contacting surfaces.

To accommodate the cam mechanism 10, a pocket or recess 80 can be formed in the core half 14 with a threaded bore 68 formed to extend from the bottom surface thereof so that with the cam mechanism 10 fastened in the pocket 80 by threading the shoulder bolt end 64 into the threaded bore 68, the housing 22 will not project from the pocket 80, and more particularly, will not project beyond the part line 82 formed between the closed mold halves 14 and 16. On the other hand, the upper mold engaging portion 50, and specifically the flat top surface 34 thereof will project beyond the pocket 80 (FIG. 3) so as to be engaged by the cavity half lower surface 16a when the mold 12 is closed. Thus, the present cam mechanism 10 is entirely contained in the housing 22 which is mounted entirely in the pocket 80 of the core half 14 so that fitting of the cam mechanism 10 herein does not require any modifications to cavity mold halves 16 as with prior cam mechanisms. As a driving surface 34 of the driver actuator 20 of the cam mechanism 10 is presented for engagement by the bottom surface 16a of the cavity mold half 16, there are also less alignment problems with the cam mechanism herein so as to provide for greater reliability in operation thereof. The present cam mechanism 10 is designed to operate for approximately 1-million molding cycles before the spring member 30 should be replaced. At this point, both the cam surfaces 40a and 42a and the coring element 40a should be lubricated to ensure continued smooth operation of the cam mechanism 10.

Figure 4:
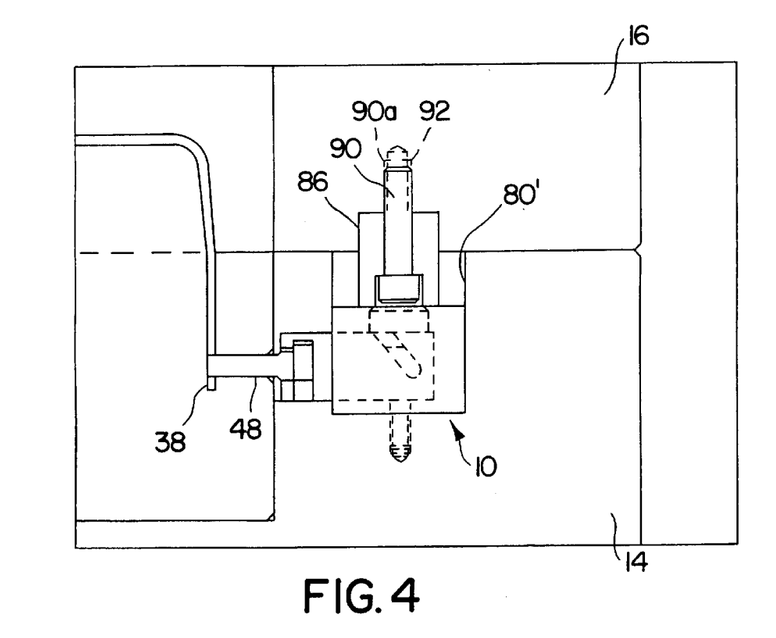
FIG. 4 is a side elevational view showing the side action mechanism secured in a deep pocket in the core half for projecting the core pin into the mold cavity at a lower position in the core half and including an extension secured to the cavity half for engaging and depressing the driver actuator when the mold halves are closed.
Figure 5:
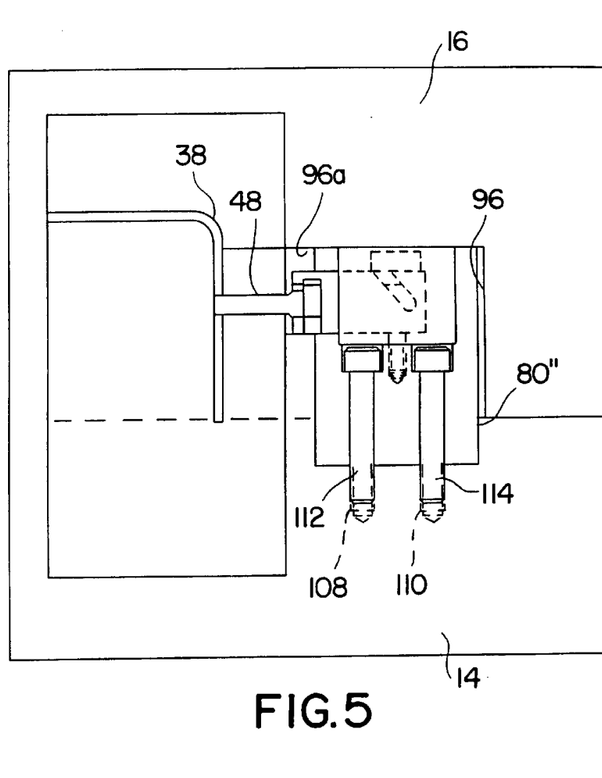
FIG. 5 is a side elevational view showing the side action cam mechanism secured in a riser mounted to the core half for being projected into a recess in the cavity half to project the side coring element into the mold cavity at a position within the cavity half.
Figure 6A:
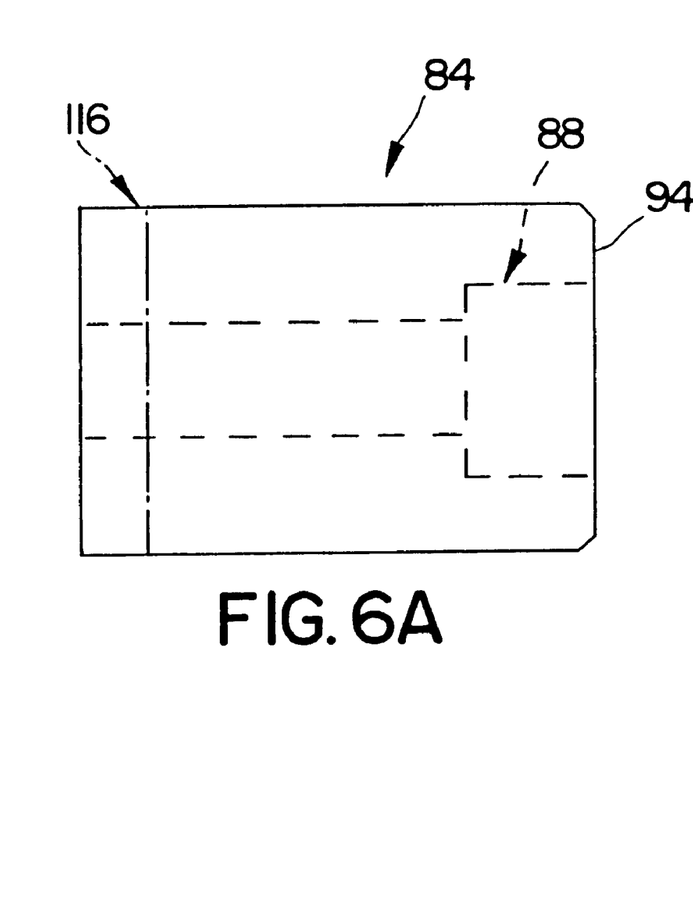
FIG. 6A is a side elevational view of the extension for the cavity half of FIG. 4.
Figure 6B:
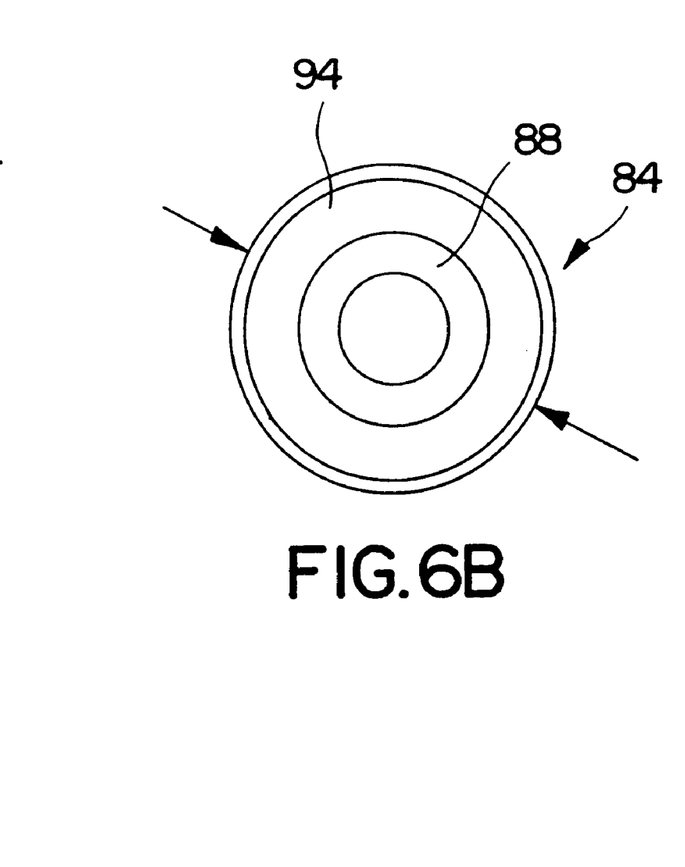
FIG. 6B is a plan view of the extension of FIG. 6A.

FIGS. 4 and 5 illustrate the cam mechanism 10 herein utilized to provide part details at different locations thereon depending on the orientation of the mold cavity 38 relative to the mold halves 14 and 16. As shown in FIG. 4, the mold cavity 48 is deeper into the core half 14 so that the coring element 48 needs to be extended into the cavity 38 at a lower position in the core half 14. FIG. 5 illustrates a situation where the mold cavity 38 is extended further into the cavity half 16 with the coring element 48 projecting into the cavity 38 at an intermediate vertical position therein. To utilize the cam mechanism 10 for coring lower in the core half 14 of FIG. 4, the pocket 80' is recessed further below the part line 82 and an extension member 84 is attached in a relatively shallow pocket 86 formed in the cavity half 16. To attach the extension member 84 in the pocket 86 so that it extends beyond the cavity half lower surface 16a and into the pocket 80' for engaging the biased driver actuator 20 when the mold 12 is closed, a countersunk bore 88 is formed through the extension member 84 for receiving a bolt fastener 90 therein. A threaded bore 92 extends centrally from the recessed surface of the pocket 86. The extension member 84 is attached in the pocket 86 by inserting the bolt fastener 90 through the bore 88 and threading a threaded end 90a of the fastener into the pocket threaded bore 92. With the extension member 84 so attached, the bolt fastener 90 and the cam mechanism shoulder bolt 58 will be in alignment with one another so that the bottom surface 94 of the extension member will engage the driving surface 34 of the actuator 20 when the mold 20 is closed, as shown in FIG. 4.

Figure 7A:
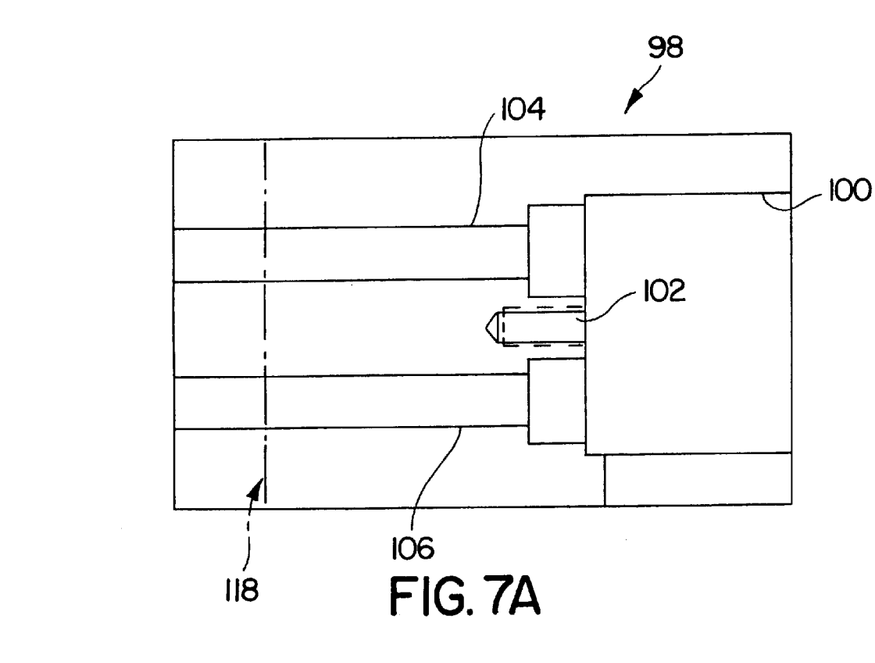
FIG. 7A is a side elevational view of the riser of FIG. 5.
Figure 7B:
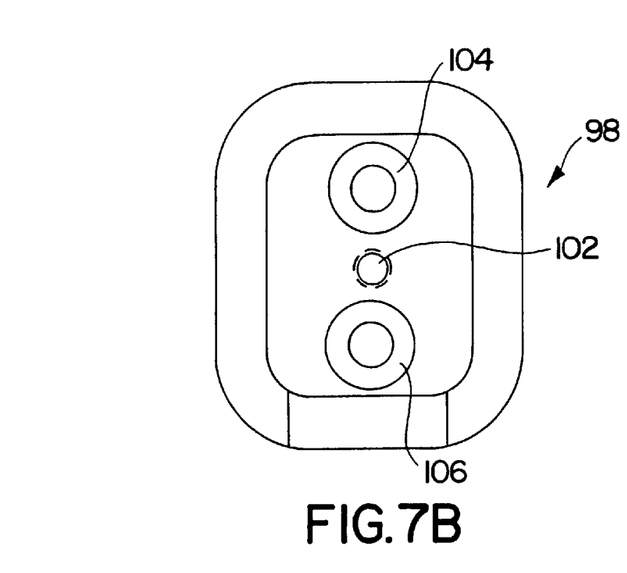
FIG. 7B is a plan view of the riser of FIG. 7A.

To utilize the cam mechanism 10 herein for coring into a mold cavity 38 which extends primarily in the cavity half 16, a pocket or recess 96 is machined in the cavity half 16 with a recessed surface 96a thereof cooperating to engage the actuator surface 34 when the mold 12 is closed, as seen in FIG. 5. To mount the cam mechanism 10 to allow the actuator 20 to be depressed by the surface 96a, a riser 98 is mounted in a shallow pocket 80" in the core half. More specifically, the riser 98 includes an enlarged cam mechanism receiving recess 100 formed therein including a central threaded bore 102 formed in the recessed bottom surface, as best seen in FIGS. 7A and 7B. To fasten the cam mechanism 10 in the recess 100, the shoulder bolt 58 is inserted through the driver actuator bore 54, with the threaded end 64 thereof inserted into the threaded bore 102 of the riser 98. To secure the riser 98 including the attached cam unit 10 into the pocket 80", the riser 98 includes a pair of countersunk bores 104 and 106 extending from the bottom of the recess 100 on either side of the central threaded bore 102 and aligned with a pair of threaded bores 108 and 110 formed in the bottom of the pocket 80Δ. Threaded bolt fasteners 112 and 114 can be inserted through the riser bores 104 and 106 and threaded into the pocket threaded bores 108 and 110 for fastening the riser 98 and attached cam mechanism 10 to the core half 14 of the mold 12. As indicated by score lines 116 and 118, both the extension member 84 and the riser 118 can be cut from their bottom to suit the needs of the particular side coring application with which they are to be used.

Figure 10:
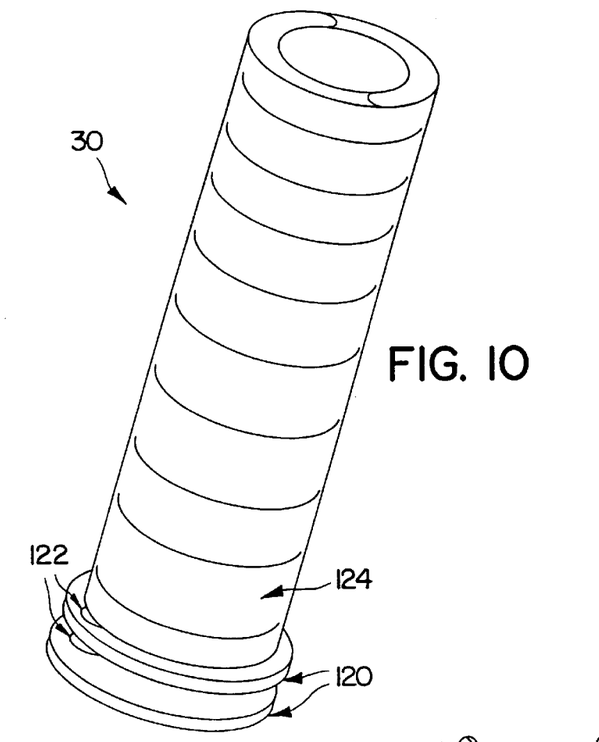
FIG. 10 is a perspective view of a two-stage biasing member for urging the driver actuator toward the cavity mold half.
Figure 11:
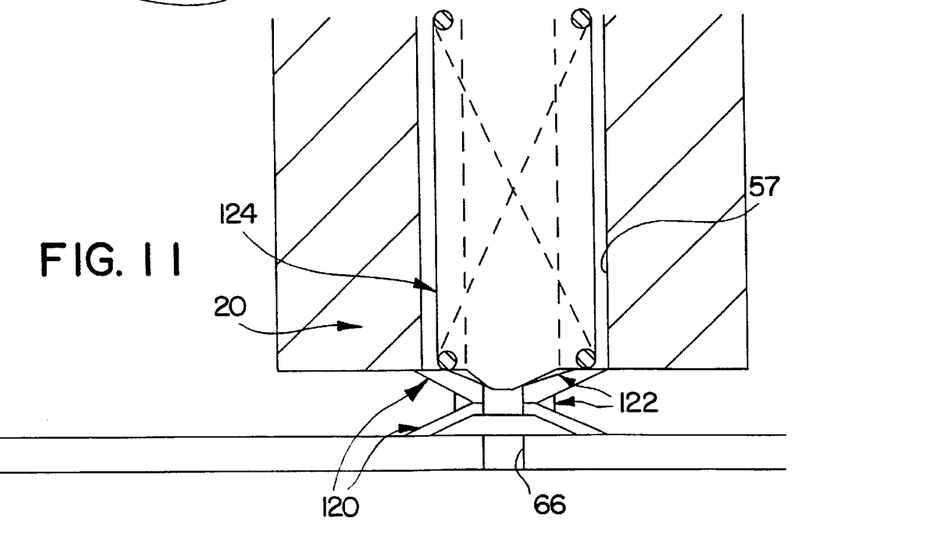
FIG. 11 is a side sectional view showing the two-stage biasing member of FIG. 10 mounted against the housing and in a bore of the driver actuator.

The compression spring member 30 can be provided as a two-stage spring loading mechanism, as best seen in FIGS. 10 and 11. As previously mentioned, the force required to withdraw the coring element 48 from the mold cavity 38 may be fairly high due to the shrinkage of plastic of the part 46 in the mold cavity 38 around the coring pin 48. To enhance the release of the coring element 48 from the cavity 38 and the plastic therearound, the present side-action cam mechanism 10 preferably includes a two-stage spring member 30 which has a high initial bias force for a short distance on the driver actuator 20 which is sufficient to break the grip of the plastic on the core pin 48 so as to allow the coring element 48 to be smoothly withdrawn from the cavity 38. The two-stage spring member 30 then exerts a secondary bias force on the actuator 20 for the remaining travel of the coring element 48 to its withdrawn or retracted position. This can be achieved by utilizing Belleville disk spring members 120 which can be attached by adhesive 122 to each other and to the bottom of a coil spring 124. It is preferred that the Belleville springs 120 have a spring force of approximately 200 pounds and act over a distance of approximately 0.010 inches which is sufficient for the initial separation force between the coring element 48 and the plastic. The coil spring 124 preferably has a spring force of approximately 30 pounds and acts over the remaining distance of travel of approximately 0.150 inches so as to move the slide carrier 18 carrying the coring pin 48 to its retracted position. In this manner, the side-action cam mechanism 10 herein provides different levels of forces over different travel lengths for movement of the core pin and slide carrier 18 therefor in a direction away from the mold cavity 38 which forces and travel distances can be tailored to meet specific molding requirements.

Figure 9A:
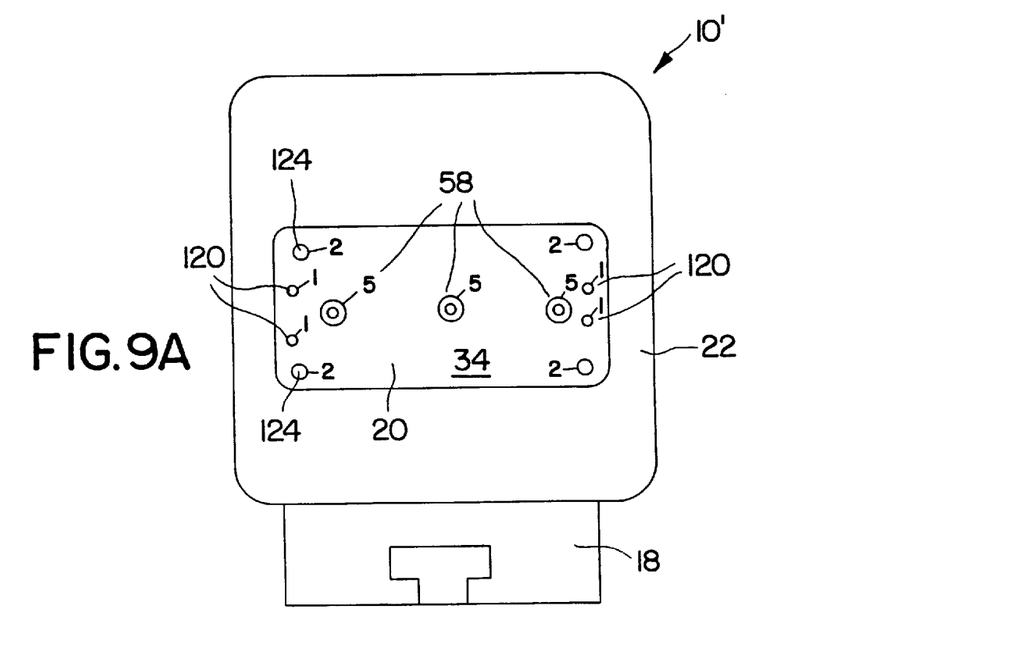
FIGS. 9A–9C are views of a larger cam mechanism in accordance with the present invention having three shoulder bolt guides with springs for the driver actuator placed at various locations in the mechanism.
Figures 9B, 9C:
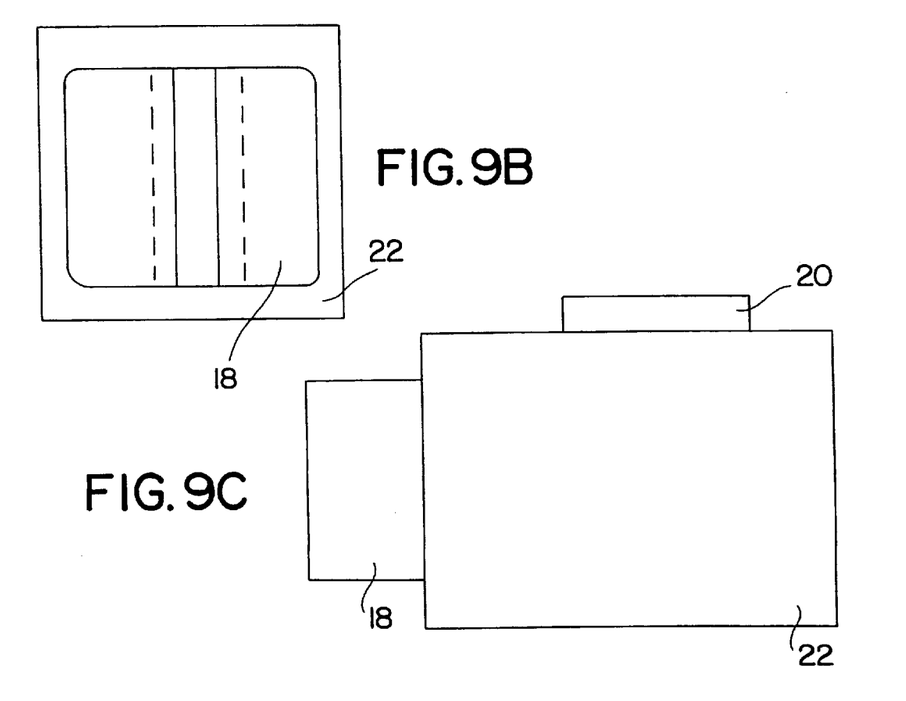

As will be apparent to those skilled in the art, the cam mechanism 10 utilizing the slide carrier 18, driver actuator 20 and housing 22 can be provided in a larger unit such as the unit 10' as illustrated in FIGS. 9A–9C and FIG. 13. In the larger cam unit 10, an increased number of shoulder bolt guides 58 can be provided such as the three shoulder bolts 58 shown with the driver actuator 20 in FIG. 9A. In addition, it will also be apparent that the spring member 30 and, more particularly, the disk springs 120 and coil spring 124 can be located at various locations around the unit for biasing the driver actuator 20 upwardly relative to the housing 22. As seen in FIG. 9A, the disk spring members 120 are provided in pairs on either side of the driver actuator 20 and the coil springs 124 are also provided in pairs with one at each corner on either side of the inner pairs of disk spring members 120.

Figure 12:
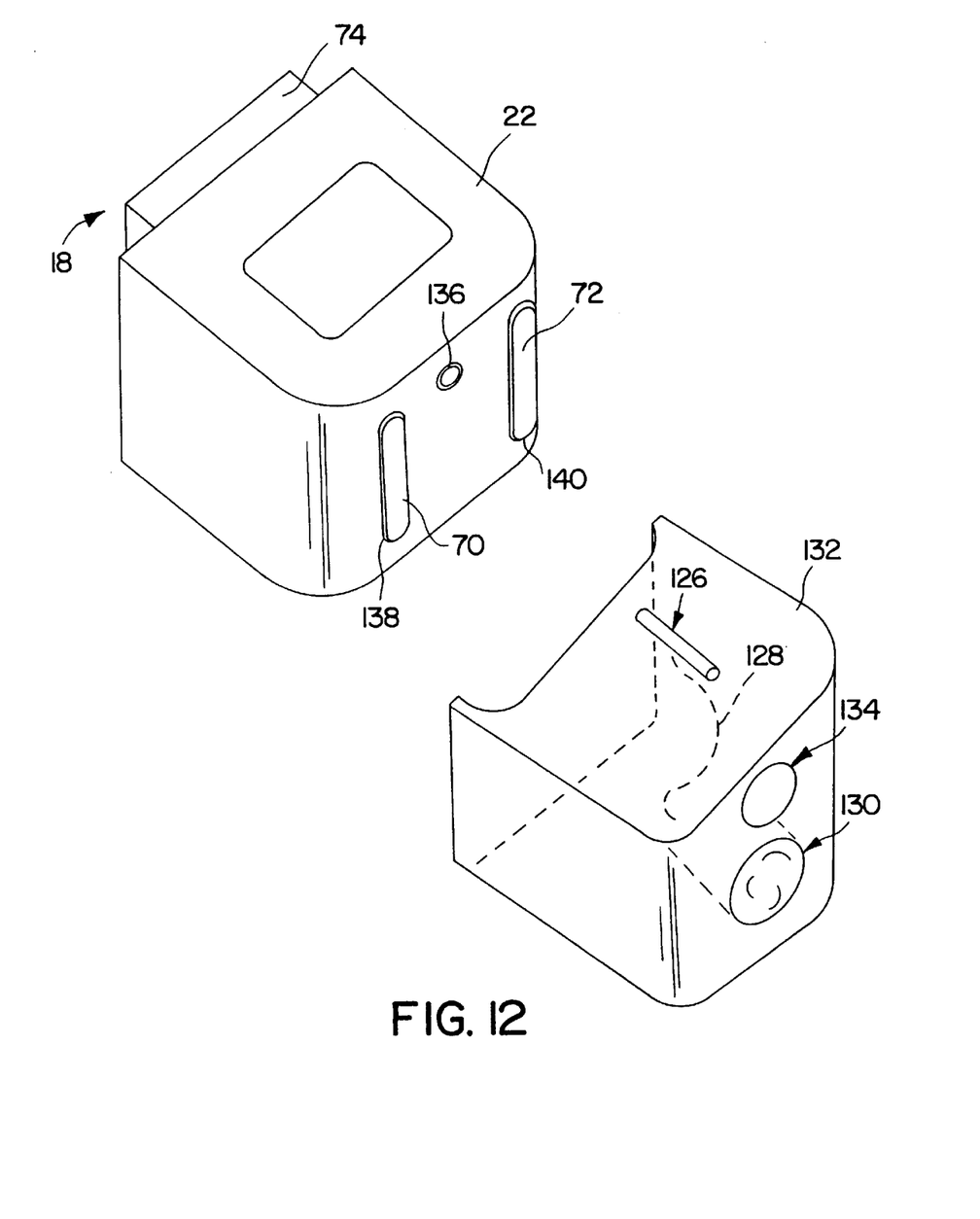
FIG. 12 is a perspective view of the side-action cam mechanism of the present invention and a switch housing to be attached to the cam mechanism and showing a switch for detecting the presence of the slide carrier in its retracted position and being electrically connected to a plug outlet.
Figure 13:
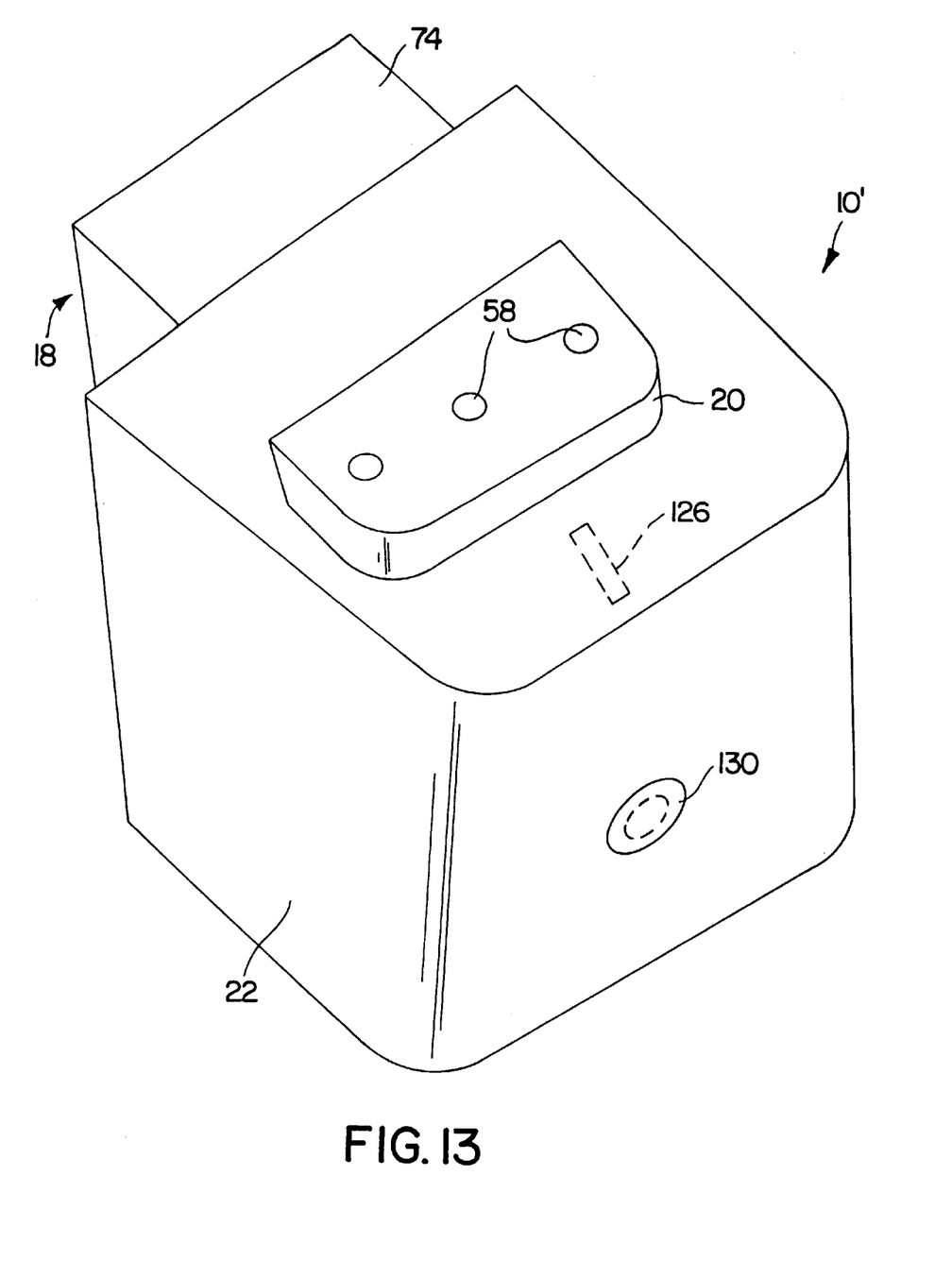
FIG. 13 is a perspective view of the larger side action cam mechanism of FIGS. 9A–9C including a switch sensor and plug integrated therewith.

To prevent the ejector assembly of the mold 12 from ejecting a part 46 prematurely before the coring element 48 has been withdrawn from the cavity 38 and the slide carrier 18 therefor is retracted in the housing 22, there can be provided a slide carrier sensor 126 for detecting when the slide carrier 18 has been fully retracted. Preferably, the sensor 126 can detect the presence of the metallic carrier 18 in the housing 22. Once the sensor 126 detects the presence of the slide carrier 18 in its retracted position, it will enable the ejector mechanism by transmitting a signal along signal transmission line 128 to an electrical juncture 130 for a switching mechanism for the ejector assembly. The switch sensor 126, signal line 128 and juncture 130, in the form of a plug, can be provided in a switch housing 132 which is adapted to be fastened to the cam mechanism housing 22 as by counterbore 134 provided in the rear wall of the switch housing 132 over the plug 130 and a corresponding threaded hole 136 in the rear wall of the cam mechanism housing 122. In addition, vertical slots 138 and 140 can be formed on either side of the rear wall of the housing 22 so that when the slide carrier 18 is retracted therein, the ends of the carrier arms 70 and 72 will register in corresponding slots 138 and 140 to indicate that the carrier 18 is in its retracted position with such position being sensed by the sensor 126, thus enabling the ejector mechanism for ejecting the molded part 46 from the cavity 38. In this manner, should the spring force fail to pull the coring element 48 and the carrier 18 therefor to their retracted position, there will be no ejection of the part 46. This is particularly important where the coring element 48 may still be disposed in the mold cavity 38 as if part ejection occurred in this situation, damage to the part 46 and/or to the pins of the ejector mechanism may take place.

In another form, the switch sensor 126, transmission line 128 and juncture 130 are all integrated into the cam mechanism housing 22 so as to obviate the need to provide a separate switch housing 132. Such an integrated switching device is shown with respect to the larger cam mechanism 10' of FIG. 13.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A molding method for forming a plastic part with a mold including first and second mold portions movable towards and away from each other in a mold movement direction and a modular side-action cam mechanism, the molding method comprising:

attaching the modular cam mechanism to one of the first and second mold portions;

providing a driver actuator of the modular cam mechanism having an engagement surface and a cam surface;

positioning the driver actuator engagement surface in a first extended position by biasing the driver actuator towards the other mold portion when the mold portions are open for movement in the mold movement direction towards the other mold portion;

moving the mold portions together to engage the driver actuator engagement surface with the other mold portion; and driving a slide device having a cam surface for cooperating with the cam surface on the driver actuator and carrying a side coring element as an incident of the engagement of the actuator engagement surface and other mold portion depressing the driver actuator against the bias and the cam surfaces cooperating to cause the slide device to move transversely of the direction of mold movement toward the mold cavity to project the coring element into a mold cavity of the closed mold portions.

2. The molding method of claim 1 wherein the driver engagement surface is extended by biasing the driver actuator towards the other mold portion and the slide is driven by providing cooperating cam surfaces on the driver actuator and the slide devices, and locking the slide device in a retracted position with the side coring element withdrawn from the mold cavity by keeping the cam surfaces engaged with each other when the mold portions are opened and the other mold portion is disengaged from the driver engagement surface so as to prevent movement of the slide device transversely of the mold movement direction toward the mold cavity absent closing movement of the mold portions.

3. The molding method of claim 1 wherein the driver engagement surface is positioned in the first extended position by first biasing the driver actuator towards the other mold portion for a first predetermined distance with a first predetermined bias force with the first distance being of sufficient length and the first bias force being sufficiently high to withdraw the side coring element from the molding cavity having the molded plastic part therein and then biasing the driver actuator towards the other mold portion with a second predetermined bias force less than the first predetermined bias force.

4. The molding method of claim 3 wherein driver actuator includes a stop for limiting travel of the driver actuator towards the other mold portion under the influence of the second bias force with the second bias force biasing the driver actuator for a second predetermined distance greater than the first predetermined distance.

5. A side-action cam mechanism for shifting a side core element into and from a cavity in a mold having first and second mold portions with at least one of the mold portions moving in a mold movement direction, the side-action cam mechanism comprising:

a slide carrier in the first mold portion moveable in a direction transverse to said mold movement direction for shifting the side core element to project into the part forming cavity and to remove the side core element from the cavity;

a driver actuator mounted in the first mold portion and having a driving surface to be engaged by the second mold portion for moving the driver actuator in the mold movement direction as the mold portions are closed and opened;

cam surfaces on the slide carrier and the driver actuator for driving the slide carrier to slide transversely of the mold movement direction (1) towards the mold cavity to project the side core element therein when the driver actuator is engaged by the second mold portion as the mold portions are moved together and closed, and (2) to withdraw the side core element therefrom as the mold portions are moved away from each other and opened.

6. The side-action cam mechanism of claim 5 wherein the first mold portion has a cam mechanism receiving recess formed therein and the cam mechanism includes a housing mounting the slide carrier and driver actuator for sliding movement therein and being secured in the first mold portion recess so that when the driver actuator is extended it is below an upper part line forming surface of the first mold portion, and the second mold portion includes a driver engaging extension secured thereto to project beyond a lower part line forming surface thereof and aligned with the extended driver actuator so that as the mold portions are moved together and closed, the extension will engage the extended driver actuator and depress it against its bias for projecting the side coring element into the mold cavity.

7. The side-action cam mechanism of claim 5 wherein the second mold portion has a cam mechanism receiving recess for receiving the cam mechanism therein when the mold portions are closed together and having a substantially flat recessed surface thereof for engaging the extended driver actuator, and a riser secured to the one mold portion mounting the driver actuator and slide carrier to project beyond an upper part line forming surface of the first mold so that as the mold portions are moved together and closed, the recessed surface of the cam mechanism receiving recess will engage the extended driver actuator and depress it against its bias for projecting the side coring element into the mold cavity.

8. The side-action cam mechanism of claim 5 wherein the cam surfaces include a slide carrier retaining position with the cam surfaces engaging each other to lock the slide carrier against transverse movement when said carrier is retracted away from the mold cavity with the side coring element withdrawn therefrom when the mold portions are opened and the biased driver actuator 4 flat surface is not engaged by the flat surface of the second mold portion and extends towards the second mold portion.

9. The side-action cam mechanism of claim 8 wherein the mold includes a sensor for detecting movement of the slide carrier to the retracted position and for enabling an ejector mechanism of the mold when the sensor detects the slide carrier in the retracted position to eject the part from the mold cavity.

10. The side-action mechanism of claim 5 wherein the driver actuator includes a bold engaging portion including the mold engaging driving surface and inclined cam members thereon, a spring for biasing the driver surface to extend towards the second mold portion, and a guide portion fixed to the first mold portion for guiding movement of the mold engaging actuator portion as it moves with the bias of the spring when the mold portions are being opened and move away from each other and against the bias of the spring when the mold portions are being closed and move towards each other, and the slide carrier includes inclined guide slots for receiving the driver cam members therein for driving of the slide towards and away from the mold cavity as the mold portions close and open, respectively.

11. The side-action mechanism of claim 10 wherein the guide portion includes a stop so as to limit the travel of the actuator portion with the spring bias towards the second mold portion when the mold portions are opened and the biased driver actuator is not engaged by the flat surface of the second mold portion to keep portions of the cam members engaged with portions of the guide slots to lock the slide carrier against transverse movement retracted away from the mold cavity with the side coring element withdrawn therefrom.

12. The side-action mechanism of claim 10 wherein the spring includes first and second spring members having predetermined spring forces with the spring force of the first spring member being substantially higher than the spring force of the second spring member and the first spring member acting to bias the actuator portion for initial movement thereof through a small predetermined distance as the mold portions begin opening and the second spring member acting to bias the actuator portion for the remaining movement as the mold portions complete opening so that the side coring element is withdrawn from the mold cavity containing the plastic molded part with a high initial force to separate the coring element from the surrounding plastic of the molded part.

13. The side-action mechanism of claim 5 including first and second springs having predetermined spring forces with the spring forces of the first spring member being substantially higher than the spring force of the second spring member and the first spring member acting to bias the driver actuator for initial movement thereof as the mold portions begin opening and the second spring member acting to bias the driver actuator for the remaining movement as the mold portions complete opening so that the side coring element is withdrawn from the mold cavity containing the plastic molded part with a high initial force to separate the coring element from the surrounding plastic of the molded part.

14. The side-action mechanism of claim 5, wherein the first mold portion is the cavity half of the mold.

15. The side-action mechanism of claim 5, wherein the first mold portion is the core half of the mold.

16. In combination, a mold having a cavity therein for molding a plastic part and a side-action mechanism for forming undercuts or recesses in the plastic part, the combination comprising:

a mold body having first and second mold halves for molding a plastic part with the mold halves being movable in a substantially linear direction between open and closed positions;

a pocket in one of the mold halves for the side-action mechanism;

a self contained modular side-action cam unit secured entirely to the one mold half in the pocket thereof without requiring substantial modifications of the other mold half for the side-action mechanism;

a driver assembly of the cam unit for moving in the direction of mold movement between an extended position relative to the one mold half when the mold halves are opened, and a depressed position by engagement of the driver assembly with the other mold half as the mold halves are being closed; and a slide carrier of the cam unit carrying a side coring element for forming the plastic part with an under-cut or recess, the slide carrier being driven by the driver assembly in a direction substantially perpendicular to the mold movement direction towards the mold cavity when the mold halves are being closed and the driver assembly is engaged by the other mold half and moving from its extended position to its depressed position.

17. The combination of claim 16 wherein the driver assembly is a plunger actuator biased to the extended position for being engaged by the other mold half and depressed against the bias, and cam surfaces of the driver plunger and the slide carrier which cooperate to move the slide carrier in the perpendicular direction as the mold halves are opened and closed.

18. The combination of claim 17 wherein the driver plunger actuator includes at least one integral cam ear inclined relative to the mold movement direction and the slide carrier includes cam guide slots for receiving the cam ear and camming the slide carrier to move it in the perpendicular direction.

19. The combination of claim 16 wherein the driver assembly and slide carrier include cooperating engaged cam surfaces wherein in the mold closed and driver assembly depressed positions the engaged cam surfaces are substantially fully engaged and cooperate to project the side coring element into the molding cavity to form the undercut or recess, and in the mold opened and driver assembly extended positions only portions on the cam surfaces are engaged with the side coring element withdrawn from the molding cavity and the engaging cam surface portions cooperating to hold the slide carrier and the coring element in the withdrawn position.

20. The combination of claim 19 wherein the driver assembly includes a plunger portion for moving between the driver assembly extended and depressed positions and a guide portion fixed to the one mold half with the guide portion guiding movement of the plunger portion between the extended and depressed positions and limiting travel of the plunger in the extended position to a predetermined distance to keep the cam surface portions engaged for holding of the slide carrier and the coring element in the withdrawn position.

21. The combination of claim 16 including a housing having transverse openings for containing the driver assembly and the slide carrier with the housing sized so as to be secured in the one mold half pocket without protruding therefrom.

22. The combination of claim 21 wherein the housing transverse opening for the slide carrier includes slide surfaces and the slide carrier and housing slide surfaces are of a low friction material to minimize frictional resistance to the sliding action therebetween as the slide carrier is driven by the drive assembly.

23. A side-action cam mechanism for being mounted to a mold for forming plastic parts in a cavity thereof, the mold including first and second mold portions which when moved together and closed form the part and when moved apart and opened allow the part to be ejected therefrom, the side-action cam mechanism comprising:

a slide carrier which carries a side coring element for being projected into the cavity when the mold portions are closed;

a driver actuator for causing the slide carrier to be moved transversely of the direction of the mold movement for projecting the side coring element into the mold cavity when the mold portions are closed and for withdrawing the side coring element from the mold cavity when the mold portions are opened; and a two-stage biasing member for the driver actuator to urge the driver actuator towards one of the first and second mold portions with a high initial bias force so as to withdraw the side coring element from the mold cavity with the plastic part formed therein as the mold portions open with a high withdrawal force for a short distance, and after the side coring element has been withdrawn and travelled the short distance, the biasing member urges the driver actuator towards the one mold portion with a secondary bias force which is lower than the higher initial bias force for the remaining travel of the side coring element away from the mold cavity.

24. The side-action cam mechanism of claim 23 wherein the high initial bias force is approximately 200 pounds and the secondary bias force is approximately 30 pounds.

25. The side-action cam mechanism of claim 23 wherein the high initial bias force acts over a distance of approximately 0.010 inches and the secondary bias force acts over a distance of approximately 0.150 inches.

26. The side-action cam mechanism of claim 23 wherein the two-stage biasing member includes at least one high spring force disk spring member and a lower spring force coil spring member.

27. The side cam action mechanism of claim 26 wherein the disk spring member comprises a pair of Belleville springs attached together with the attached Belleville springs being attached to the coil spring to form the two-stage biasing member.

28. A side-action cam mechanism for shifting a side core element into and from a cavity in a mold having first and second mold portions, the side-action cam mechanism comprising:

a slide carrier in the first mold portion for shifting the side core element to project into the part forming cavity and to remove the side core element from the cavity;

a driver actuator having a driving surface to be engaged by the second mold portion as the mold portions are closed and opened;

cam surfaces on the slide carrier and the driver actuator so that the driver actuator drives the slide carrier to slide transversely of the mold movement direction (1) towards the mold cavity to project the side core element therein when the driver actuator is engaged by the second mold portion as the mold portions are moved together and closed, and (2) to withdraw the side core element therefrom as the mold portions are moved away from each other and opened;

a cam mechanism receiving recess formed in the first mold portion; and, a housing mounting the slide carrier and driver actuator for sliding movement therein and being secured in the one mold portion recess so as to mount the entire side-action mechanism to the first mold portion with the second mold portion substantially free of the side-action mechanism components.

* * * * *